Figures 1, 2:
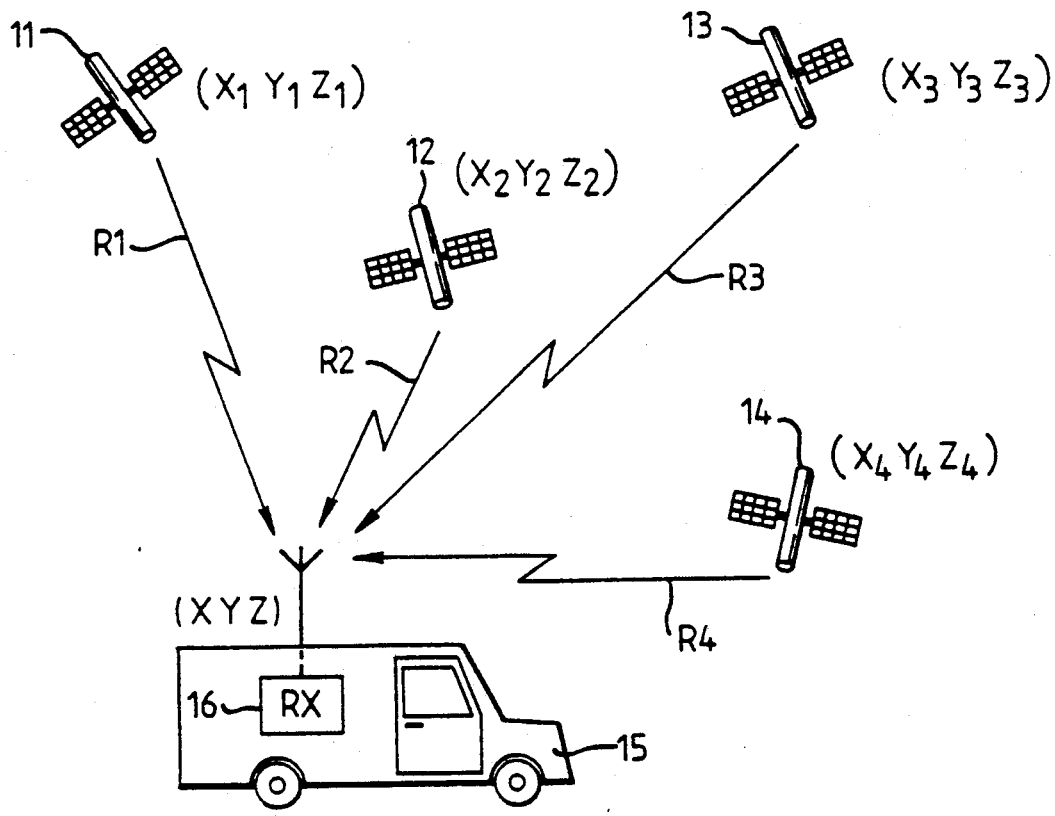

United States Patent [19]

Barnard

[11] Patent Number: 5,119,101
[45] Date of Patent: Jun. 2, 1992

[54] METHOD OF AND APPARATUS FOR OBTAINING VEHICLE HEADING INFORMATION

[75] Inventor: Michael E. Barnard, Reigate, England

[73] Assignee: U.S. Philips Corporation, New York, N.Y.

[21] Appl. No.: 703,224

[22] Filed: May 20, 1991

[30] Foreign Application Priority Data

Jun. 18, 1990 [GB] United Kingdom ............. 9013527

[51] Int. Cl.$^5$ .................... H04B 7/185; G01S 5/02
[52] U.S. Cl. .................................................. 342/357
[58] Field of Search ............. 342/357, 352; 364/449, 364/459

[56] References Cited

U.S. PATENT DOCUMENTS 4,797,677  1/1989  MacDoran et al. ............. 342/352

*Primary Examiner*—Theodore M. Blum
*Attorney, Agent, or Firm*—Lesley Rhyne

[57] ABSTRACT

When fewer than three of the satellites of a satellite global positioning system (GPS) such as NAVSTAR are visible to a user (15), the user cannot obtain independent positional information from the system. Since a satellite (11) in such a system is moving with respect to a user (15), its signals are received with a Doppler offset from their normal centre frequency and the frequency offset due to the satellite motion alone is calculable for a user at an approximate location from a given satellite. An additional Doppler frequency offset will result from any movement of the user. The magnitude of the additional frequency shift, in conjunction with the known speed (m) of the user, can be used to calculate the angle between the satellite motion ($V_1$) and the user's motion and since the direction of the former is known, the user's heading from local North (N) can be calculated in instances where only one or two GPS satellites (11,12) are visible to a user.

13 Claims, 3 Drawing Sheets $$(X_1-X)^2 + (Y_1-Y)^2 + (Z_1-Z)^2 = (R_1-C_B)^2$$
$$(X_2-X)^2 + (Y_2-Y)^2 + (Z_2-Z)^2 = (R_2-C_B)^2$$
$$(X_3-X)^2 + (Y_3-Y)^2 + (Z_3-Z)^2 = (R_3-C_B)^2$$
$$(X_4-X)^2 + (Y_4-Y)^2 + (Z_4-Z)^2 = (R_4-C_B)^2$$

METHOD OF AND APPARATUS FOR OBTAINING VEHICLE HEADING INFORMATION

DESCRIPTION

The present invention relates to a method of and apparatus for obtaining the heading of a moving vehicle using a satellite based global positioning system (GPS) such as NAVSTAR, having particular, but not exclusive, application to maintenance of vehicle positional information when a limited number of GPS satellites are in view of the user.

The NAVSTAR GPS is described in NATO Standardization Agreement STANAG 4294 "NAVSTAR global positioning system GPS system characteristics—preliminary draft" but a brief summary of the system is included here. The NAVSTAR GPS consists of a number of satellites in approximately 12 hour, inclined orbits of the earth, each satellite transmitting continuous positional information. Two positioning services are provides by NAVSTAR, the precise positioning service (PPS) which is reserved for military use and the standard positioning service (SPS) which is available for general use. The following description is confined to the SPS although some features are common to both systems. A user of the GPS receives the transmissions from those GPS satellites currently in view and calculates their correct positions. Details of these calculations, using an Earth-Centered, Earth-Fixed (ECEF) reference system are given in the STANAG document. By measuring the propagation time of the satellite transmissions and hence the distances from three satellites to himself, the user can make an accurate calculation of his position in three dimensions. To make a valid positional fix, the user needs to measure the propagation times to an accuracy of better than 100 ns and to facilitate this the satellite signals each have timing marks at approximately 1 μs intervals. However, each satellite's signals are synchronized to an atomic clock and the normal user of the system will not maintain such an accurate clock. As a result the user's clock is said to be in error (in other words, different from satellite time) by a clock bias $C_B$. By measuring the apparent satellite signal propagation times from four satellites rather than three, the redundancy can be used to solve for $C_B$ and the three accurate propagation times required can be calculated. The ranges of the user from the satellites are equal to the signal propagation times multiplied by the speed of light c. Prior to correction for the user's clock bias $C_B$, the apparent ranges of the satellites are all in error by a fixed amount and are called pseudoranges.

FIG. 1 of the accompanying drawings shows a radio receiver 16 in a user's vehicle 15 receiving signals from four GPS satellites 11, 12, 13 and 14. The four pseudoranges of the satellites signals are denoted R1, R2, R3 and R4. The positions of the satellites and the vehicle are shown as three-dimensional coordinates whose origin is the center of the Earth. FIG. 2 of the accompanying drawings shows the equations used by a GPS receiver to calculate the three dimensional coordinates and the clock bias from a knowledge of four satellite positions and their respective pseudoranges. While it is not essential, these equations are usually solved using numerical techniques to hasten the calculations. It is important to note that the clock bias $C_B$ has the dimension meters in order to agree with the remainder of the equation. $C_B$ can be converted to a time by division by the speed of light c. Further details of the algorithms required to use the GPS are to be found in the above reference, STANAG 4294.

The data transmitted by each satellite consists broadly of three sets of information, the ephemeris, the almanac and the clock correction parameters. The ephemeris consists of detailed information about the satellite's own course over a period of approximately two hours, the almanac consists of less detailed information about the complete satellite constellation for a longer period and the clock correction parameters allow the user to correct for the GPS satellite's own clock errors. The positions of the satellites are calculated from the GPS ephemeris data and the Keplerian Orbital Parameters which are used to describe the orbit of each satellite. The satellite transmissions consist of a direct sequence spread spectrum (DSSS) signal containing the ephemeris, almanac, and the clock correction information at a rate of 50 bits per second (bps). In the case of the SPS a pseudo random noise (PRN) signal which has a cip rate of 1.023 MHz and which is unique to each satellite is used to spread the spectrum of the information, which is then transmitted on a center frequency of 1575.42 MHz. The PRN signal is known as a coarse/acquisition (C/A) code since it provides the timing marks required for fast acquisition of GPS signals and coarse navigation. The signals received at a user's receiver have a bandwidth of approximately 2 MHz and a signal to noise ratio (S/N) of approximately $-20$ dB. In addition, since the satellites are each moving at a speed in excess of 3 km/s, the GPS signals are received with a Doppler frequency offset from the GPS center frequency. As a result, a stationary GPS receiver has to be capable of receiving signals with frequencies of up to ±4 KHz from the GPS center frequency, and a mobile receiver (as is usually the case) has to be able to receive signals over an even greater frequency range. To recover the data and measure the propagation time of the satellite signals, the GPS receiver must cancel or allow for the Doppler frequency offset and generate the C/A code relevant to each satellite. Initially, at least, this can be very time consuming since to despread the DSSS signals, the incoming and locally generated PRN codes must be exactly at synchronism. To find the PRN code delay the receiver must compare the locally generated code and the incoming code at a number of different positions until the point of synchronism or correlation is fund. With a code length of 1023 chips this comparison can be a lengthy procedure. However, once the frequency offset and the PRN code delay for each satellite are known, tracking them is relatively easy.

One drawback of the NAVSTAR GPS is that there are frequent occasions when a full complement of four satellites are not directly visible to the user and so the full positional accuracy of the system is not available. The option exists to make two dimensional position fixes with only three satellites visible, which is useful for example if the altitude of the user is known. However, in urban environments particularly, there will often be only one or two GPS satellites visible to the user for substantial periods of time and the user will have to resort to an alternative method of position determination. One possibility is the use of a dead reckoning system based upon the distance travelled by each of a non-driven pair of wheels on the user's vehicle. Such a dead reckoning system usually suffers from an accumulation of errors that results in a drift of the measured heading from the true heading and, as a result, an accurate update of the heading of the vehicle is needed from time to time to ensure continued directional accuracy.

It is an object of the present invention to permit continued use of a GPS in situations of limited satellite visibility by determining the heading of a moving vehicle using the reception of signals from fewer than three GPS satellites.

According to a first aspect of the present invention there is provided a method of obtaining vehicle heading information from a global positioning system (GPS), characterized in that the method comprises determining the Doppler frequency offset present on a signal received at the vehicle from at least one GPS satellite due to the motion of that satellite alone, measuring the actual Doppler frequency offset on the signal received from the or each satellite due to the motion of that satellite combined with the motion of the vehicle moving at a known speed and deriving the heading of the vehicle from a difference between the said Doppler frequency offset due to the motion of the satellite alone and the said actual Doppler frequency offset.

According to a second aspect of thee present invention there is provided a GPS receiver that operates in accordance with the above method.

According to a third aspect of the present invention there is provided a dead reckoning navigation system for mounting in a vehicle comprising a GPS receiver and a means of measuring the speed of the vehicle, wherein the GPS receiver operates to determine the present heading of the vehicle in accordance with the above method.

A GPS receiver used to implement the method in accordance with the first aspect of the present invention may include one or more frequency down conversion stages, typically comprising a mixer and a local oscillator. Since the present invention relies upon an accurate knowledge of the frequency of the incoming satellite signals, any drift in the frequency of the receiver's local oscillators will be detrimental to the accuracy of the vehicle heading that is subsequently determined. The amount by which these oscillators have drifted in frequency can be determined by two different methods.

In the first method signals from two satellites are received which give a pair of simultaneous equations that can be solved to cancel the local oscillator offset frequencies. This method is analogous to the use of a fourth satellite signal to solve the same problem within a conventional GPS receiver.

The second method requires the receipt of a signal from only one satellite but relies upon the vehicle being stationary from tine to time. This, however, is a common occurrence in built-up areas where satellite visibility is often limited. When the vehicle is stationary the observed Doppler offset on received satellite signals will be entirely due to the motion of the satellite and the correct value of this Doppler offset at an approximately known user position can be calculated from the satellite ephemeris data. The difference between the observed offset frequency and the calculated Doppler offset frequency is due to the drift in the receiver local oscillator. This value of frequency drift will be accurate for limited time that depends upon the oscillator stability but should nonetheless be accurate enough to allow a heading calculation.

A dead reckoning navigation system for a vehicle usually makes use of speed or distance sensors on a pair of the vehicle's wheels and some means of accumulating the distance travelled by each wheel. When the vehicle turns, one wheel will travel further than the other and the angle that the vehicle has turned through is calculable. Since the system has a record of changes of direction and distance traveled it can maintain an up-to-date position fix for the vehicle. However, such dead reckoning systems accumulate errors due to tire pressure differentials, wheel slip and the like, and it is usual to supplement their operation with a magnetic compass which provides independent heading In formation. These systems, however, possess the drawback that magnetic compasses are difficult to operate satisfactorily in a steel-bodied vehicle and are also upset by large pieces of ferromagnetic material. The method for obtaining vehicle heading information described above does not suffer from these drawbacks. Such a dead reckoning navigation scheme could be used to supplement the operation of a GPS system when a limited number of satellites is visible to the user. There is also the possibility of using a GPS receiver to supplement a dead reckoning navigation system.

A dead reckoning navigation system may also be used to resolve a possible ambiguity in vehicle heading which is due to the fact that there are two possible physical directions of vehicle travel which correspond to each value of the difference between the observed and the calculated values of Doppler shift. The difference in distance traveled by a pair of the vehicle's wheels can be used to resolve this ambiguity and so can a device, for example a shaft encoder, coupled to the steering column of the vehicle in conjunction with a means of measuring the distance traveled by the vehicle.

A doppler radar speedometer may be substituted for a conventional device which measures wheel revolutions. An advantage of using a doppler radar speedometer is that it offers a potential improvement in the performance of the dead reckoning navigation system as the radar is immune to errors caused by tire pressure changes and wheel slip. In addition the rate of turn of a vehicle may be determined using a pair of radar transceivers positioned to measure the lateral speed of the vehicle. This can be used to give relative heading changes so that the dead reckoning can properly integrate the displacement of the vehicle from the known starting point. An accuracy of 1% of distance travelled should be obtainable from such an arrangement.

All of the aspects of the present invention are based on the realization that the Doppler offset frequency of the signals received from just one GPS satellite, when combined with the known speed of a moving GPS receiver, can be used to determine the receiver's heading. Thus an existing GPS receiver can, with the addition of a vehicle speed measuring device, function as a dead-reckoning navigation system for periods of time when fewer than three GPS satellites are directly visible to the receiver.

Figure 3:
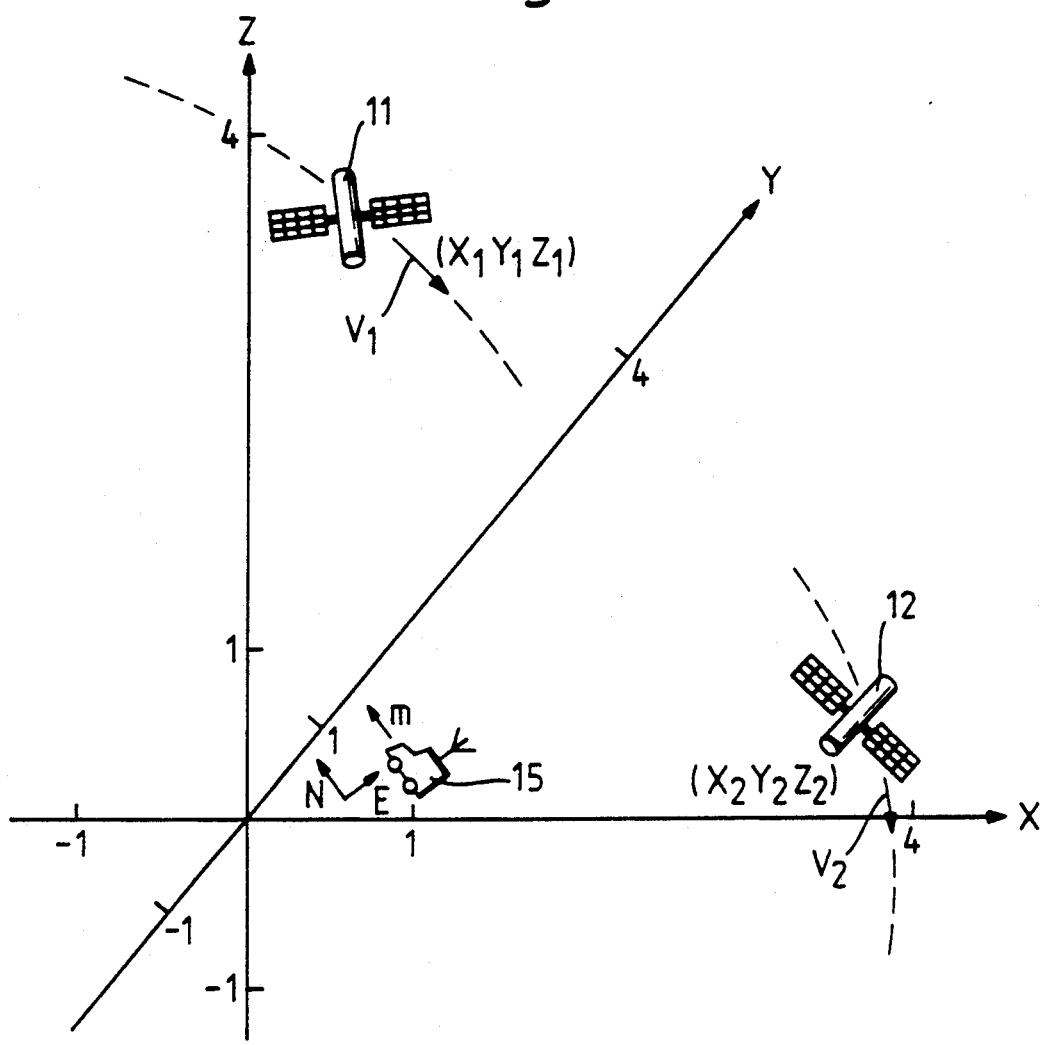
Figure 4:
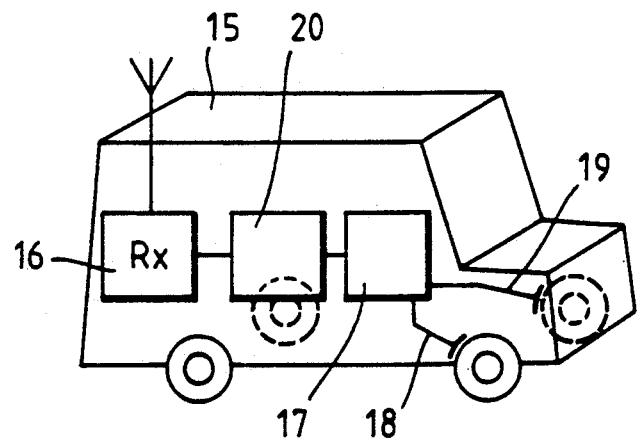
Figure 5:
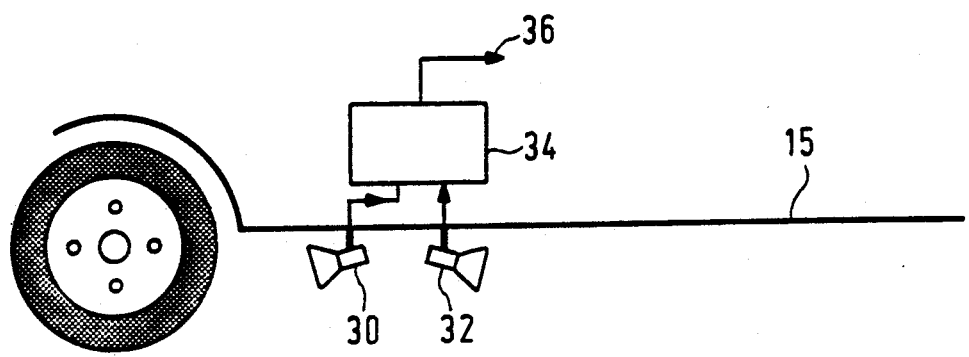
Figure 6:
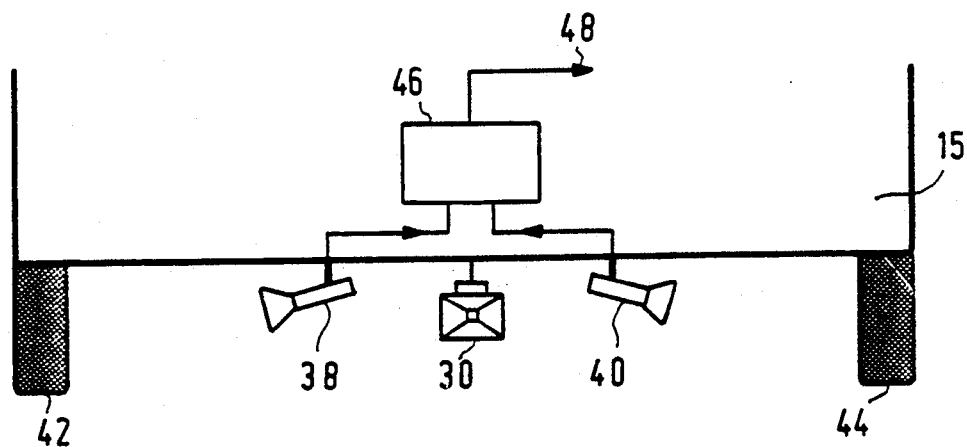

The present invention will now be explained and described, by way of example, with reference to the accompanying drawings, wherein:

FIG. 1 shows a vehicle containing a NAVSTAR receiver which is receiving signals from four NAVSTAR satellites, FIG. 2 shows the equations used by a NAVSTAR receiver to determine a three-dimensional position fix from four satellite pseudoranges, FIG. 3 shows the Earth centered, Earth fixed (ECEF) coordinate axes used by NAVSTAR, including two satellites and one terrestrial GPS user, FIG. 4 shows a vehicle containing a NAVSTAR receiver and a dead reckoning navigation system including a pair of wheel speed sensors, FIG. 5 shows a partial side view of a vehicle fitted with a Doppler radar speedometer, and FIG. 6 shows a Doppler radar system, for determining the magnitude of a vehicle turn, fitted between the steering wheels of the vehicle.

In the drawings corresponding features have been identified using the same reference numerals.

In the accompanying drawings FIG. 3 shows the ECEF axes (X,Y,Z) used by the NAVSTAR GPS, two GPS satellites 11,12 with dotted arcs representing their courses, and a moving vehicle 15 containing a NAVSTAR receiver. The axes are marked with an approximate scale in which unity represents one radius of the Earth. On this scale the radius of the GPS satellites orbits is approximately four. Lines representing the transit of the GPS signals from the satellites to the user have been omitted for clarity. Vector $V_1$ represents the velocity of satellite 11 and vector $V_2$ represents the velocity of satellite 12. The vehicle 15 is assumed to be moving with a speed m. The components of the vehicle speed in the local North (N) and East (E) directions are $m.\cos\theta$ and $m.\sin\phi$ respectively, where $\phi$ is the vehicle's heading from local North. The components of the satellite velocity $V_1$ in the directions X, Y and Z are $V_{1X}, V_{1Y}$ and $V_{1Z}$ respectively.

The components of the satellite velocity $V_2$ in the directions X, Y and Z are $V_{2X}, V_{2Y}$ and $V_{2Z}$ respectively. These details concerning satellite velocities are obtainable from the satellite ephemeris using trigonometry. At the NAVSTAR receiver, the signals from each of the satellites are received with a perceived frequency offset from the GPS center frequency of 1575.42 MHz. Usually part of this perceived offset will be due to the Doppler Effect on the relative vehicle and satellite motion and a part will be due to the instabilities of the local oscillator(s) in the receiver (not shown). The total perceived offset is denoted by $\Delta f$ and the receiver oscillator offset(s) are collectively denoted by $\Delta d$. The true frequency offset due to the relative satellite and vehicle motion is thus given by $(\Delta f - \Delta d)$.

The approximate position of the user is assumed to be known, for example from the use of the GPS in the traditional manner prior to one or more athletes being blocked from view, from use of a dead reckoning navigation system mounted in the vehicle or perhaps from a knowledge of which cell of a cellular radio system the vehicle is in. From this approximate position, it is possible to calculate the velocity of the satellite relative to the vehicle. The vehicle position need only be known approximately, say to within a few km, since the distance between the satellite and the vehicle is at least 20,000 km and at that distance any small error in vehicle position subtends an almost non-existent angular error at the satellite. The expected frequency of the received satellite signals can be calculated from the following equation:

$$frx = (v/c + 1)ftx$$

where frx is the observed frequency of the signals at the receiver, ftx is the transmission frequency of the signals, in this case the GPS center frequency, c is the speed of light and v is the relative velocity of the satellite and the user towards each other. The resulting Doppler frequency offset is given by (frx − ftx).

Any additional frequency offset at the receiver (except for that due to local oscillator offsets) will be due to the vehicle motion. The speed (m) of the vehicle has to be known by some means, such as a wheel rotation sensor, possibly in conjunction with an anti-lock braking system (ABS). The angles joining the line between the vehicle and the satellite to the axes of the ECEF coordinate system and the vehicle's local North and East axes are calculated from the known satellite and approximate vehicle positions using three dimensional trigonometry. As for a conventional position fix using the GPS, the calculations required to find the satellite positions are included in the reference STANAG 4294. The portion of the received Doppler offset due to the vehicle motion will depend upon the vehicle's heading, relative to the satellite. If the vehicle is moving towards or away from the satellite, this portion of the offset will be a maximum. If the vehicle is moving tangentially to the satellite, this portion of the offset will be a minimum. The following equation allows the calculation of $\phi$ and is given for the first satellite 11:

$$k\Delta f_1 = k\Delta d + V_{1X}\cdot\cos\theta_{1X} + V_{1Y}\cdot\cos\theta_{1Y} + V_{1Z}\cdot\cos\theta_{1Z} - m\cdot\cos\phi\cdot\cos\theta_{1N} - m\cdot\sin\phi\cdot\cos\theta_{1E}$$

The additional factor in this equation, k, is equal to the speed of light c divided by the GPS center frequency of 1575.42 MHz and is included to make the frequency offsets $\Delta f_1$ and $\Delta d$ dimensionally identical to the velocities in the rest of the equation. $\Delta f_1$ is the perceived frequency offset at the receiver of the signals from the satellite 11. $\theta_{1X}$ is the angle between the line joining the vehicle and the satellite to the axis X, $\theta_{1Y}$ is the angle between the line joining the vehicle and the satellite to the axis Y, $\theta_{1Z}$ is the angle between the line joining the vehicle and the satellite to the axis Z.

Before this equation can be used to determine the heading of the vehicle $\phi$, the local oscillator frequency offset $\Delta d$ must be determined and two means of so doing will now be described.

Just as the visibility of four satellites allows a three dimensional position fix and the received clock bias to be calculated when the GPS is being used in the conventional manner, reception of signals from a pair of satellites allows the calculation of $\Delta d$ and determination of the vehicle heading. A duplicate of the equation above containing the course information and the Doppler frequency offset information for a second visible satellite is given for satellite 12:

$$k\Delta f_2 = k\Delta d + V_{2X}\cdot\cos\theta_{2X} + V_{2Y}\cdot\cos\theta_{2Y} + V_{2Z}\cdot\cos\theta_{2Z} - m\cdot\cos\phi\cdot\cos\theta_{2N} - m\cdot\sin\phi\cdot\cos\theta_{2E}$$

$k\Delta f_2$ is the total frequency offset of the signals received from the satellite 12. $\theta_{2X}$ is the angle between the line joining the vehicle and the satellite to the axis X, $\theta_{2Y}$ is the angle between the line joining the vehicle and the satellite to the axis Y, $\theta_{2Z}$ is the angle between the line joining the vehicle and the satellite to the axis Z. $\theta_{2N}$ is the angle between the line joining the vehicle and the satellite to the vehicle's local North axis and $\theta_{2E}$ is the angle between the line joining the vehicle and the satellite to the vehicle's local East axis. The second equation can be solved simultaneously with the first equation above and, provided that the local oscillator(s) do not drift to any significant extent between the two measurements of total frequency offset $\Delta f_1$ and $\Delta f_2$, the local oscillator offset $\Delta d$ is canceled between the two equations and $\phi$ is calculable. Alternatively, if the receiver local oscillator(s) remain stable to within approximately 1 Hz over a period of at least 10 seconds and the vehicle is stationary from time to time (a common occurrence in the built-up areas where satellite visibility is generally poor) then a signal from only one GPS satellite is required to calculate $\phi$. Referring to either of the equations above, if the vehicle is stationary, m is equal to zero and thus so are the least two terms of the equation. The other terms of the equation are all known or are calculable from GPS ephemeris data, which gives an accurate estimate of $\Delta d$. Provided that the vehicle is in sufficiently rapid motion quickly enough before or after a stop, this value of $\Delta d$ can be substituted into the equation, and data obtained while the vehicle is in motion used to determine the vehicle heading. The question of what constitutes sufficiently rapid vehicle motion is determined by the required accuracy and is addressed in the following paragraphs. It is, of course, possible to make the moving and the stationary frequency offset measurements in the reverse order and to make the directional calculation after the vehicle has stopped. Since vehicles generally brake at a greater rate than they accelerate, this will probably be more accurate.

The accuracy of either of these methods of negating the effect of local oscillator offsets and determining vehicle headings depends upon the receiver's local oscillator stability, the speed of the vehicle and the accuracy to which the satellite velocity is known. The receiver's local oscillator(s) are assumed to be stable to within 1 Hz over the duration of Doppler frequency offset measurement. This should not present a problem in the case of two satellites being visible but the length of time required to make a moving and a stationary measurement from one satellite will allow the local oscillator(s) to drift to a greater extent. The vehicle's speed m is assumed to be accurately known at 10 m/s. The accuracy to which the satellite velocity can be determined depends upon the processing power available to the GPS receiver but generally the components of the velocity can be determined to better than 0.1 m/s and since the satellites are moving at speeds in excess of 3 km/s this velocity error can be disregarded. Errors in the values of $\theta$ are very unlikely to be significant because of the very small angular error that a user's ground position error subtends at a satellite. The value of k is equal to the speed of light c divided by the GPS center frequency and is approximately equal to 0.19 m.

The lower of may two satellites visible to the user will usually be the most favorable one to use for making the directional measurement and the assumption is made here that the lowest visible satellite is due North of the vehicle at an elevation angle of 50 degrees. The value of $\sin \phi$ is zero so the error in $m.\cos\phi \cdot \cos \theta_{1N}$ is approximately equal to the value of k (since the error in $\Delta f_1$ is assumed to be less than 1 Hz). Since m = 10 and $\cos \theta_{1N} = \cos 50$ degrees $= 0.643$, the value of the error in $\cos \phi$ with 1 Hz of error in $\Delta f$ is equal to $(0.19/10 \times 0.6433)$ and this corresponds to an error in $\phi$ of less than 2 degrees which is at least as good as a conventional magnetic compass.

Occasionally, such as when the vehicle turns sharply, the method described for calculating the vehicle heading will fail because there are always too possible physical directions of vehicle travel for a given value of $\phi$. If a line is taken between the satellite and the vehicle, the same Doppler frequency offset will be observed at the vehicle for two different vehicle directions, one on either side of the line. If a dead reckoning navigation system including differential wheel speed sensors is fitted to the vehicle, this heading ambiguity can be resolved in the following way. For a given calculated value of $\phi$ there will be two possible vehicle headings. If the vehicle makes a turn through an angle greater than the error in calculating $\phi$, the degree of the turn as determined by the dead reckoning navigation system can be used to calculate two new possible headings based on the previous ones. The GPS receiver is then used to calculate $\phi$ and hence two new possible vehicle headings using the received Doppler frequency offset. Provided that the vehicle has turned sharply enough, only one of the calculated and predicted new possible vehicle headings will match and can be correct.

A block schematic diagram of a vehicle containing a GPS receiver and differential wheel speed detection means is shown in FIG. 4. A user's vehicle 15 has two sensors 18 and 19 on a pair of non-driven wheels. The outputs of these sensors are fed to a dead reckoning navigation unit 17. This navigation unit is interfaced to a GPS receiver 16 by a control unit 20. The dead reckoning navigation unit is arranged to operate to determine distance and direction traveled as previously described.

An alternative method of determining the magnitude of a vehicle turn is to measure the degree of the turn applied to the steering wheel and combine this with the distance traveled by the vehicle. One possible means for measuring the degree of turn applied to the steering wheel is to drive a potentiometer via a gearing arrangement from the steering column. An output of the potentiometer coupled be fed to an analog to digital converter to provide a digital output. An optical or magnetic shaft encoder could also be used in place of the potentiometer and gearing arrangement. Means for measuring the degree of turn applied to the steering wheel could be incorporated in a number of alternative positions within a vehicle's steering system.

To use a means of measuring the degree of turn applied to a steering column to determine the magnitude of a vehicle turn, the degree of rotation applied to the steering column must be combined with a measure of the distance traveled by the vehicle during its turn. This distance may be determined by the use of a wheel rotation sensor 18 (FIG. 4) or by other means, for example, a Doppler radar speedometer. The relationship between the degree of turn applied to the steering column, the distance traveled and the degree of the vehicle turn will be dependent upon the vehicle's wheelbase. Once the angle through which the vehicle has turned has been determined, the directional ambiguity in the vehicle heading can be resolved as described above.

The accuracy of a dead reckoning system in accordance with the present invention may be enhanced by the use of a Doppler radar speedometer instead of a conventional device which measures wheel rotations. A Doppler radar speedometer measures the speed of the vehicle by transmitting a signal at an angle towards the ground and that portion of this signal which is reflected towards the radar is received and detected. Movement of the vehicle relative to the ground will cause a Doppler frequency shift on the reflected signal from which the speed of the vehicle may be determined. This technique of speed measurement is discussed in UK patent specification GB 2 101 831B. The speed in turn can be integrated to give the distance traveled. Errors caused by the vehicle tilting forwards or backwards relative to the road can be canceled by the use of a pair of radar antennas. one facing forwards and one facing backwards. A typical arrangement is shown in FIG. 5 where a forward facing horn antenna 30 and a backward facing horn antenna 32 are attached to the underside of a vehicle 15. The antennas 30,32 are arranged at a downwards angle to ensure that an adequate reflection signal from the road is received. The antennas are electrically connected to a radar control unit 34 which takes the average of the Doppler frequencies from the two antennas to allow for tilt of the vehicle. The radar control unit 34 may also include an integrator to maintain a record of total distance traveled. An output 36 from the radar control unit 34 may be fed to the control unit 20 (FIG. 4) to provide either speed measurement, distance measurement, or both.

Additionally the magnitude of a vehicle turn may be determined by using a further pair of radar antennas mounted between the steering wheels of the vehicle. The beams from these antennas are aimed sideways towards the road surface as shown in FIG. 6. A right-facing horn antenna 38 is shown attached to the underside of a vehicle 15 between the steering wheels 42,44 and is inclined downwards. A left-facing horn antenna 40 is also attached to the underside of a vehicle 15 between the steering wheel and is also inclined downwards. The forward facing antenna 30 is also visible in this Figure. The signals received at the two sideways mounted antennas are fed to a radar control unit 46 which determines the lateral sped of the vehicle and provides an output signal 48 to the control unit 20 (FIG. 4). The magnitude of the vehicle turn can be determined from the lateral speed and the forward speed.

While the antennas 30,32,38,40 have been depicted as horn antennas, it will be appreciated that a number of other types of radar antenna are suitable for the purpose. A configuration of just three Doppler radar antennas facing in different directions will also permit the vehicle's forward and lateral speeds to be measured.

While the present invention has been described with reference to the NAVSTAR GPS, it may be adapted to function with other systems, for example, the Soviet Union's GLONASS.

From reading the present disclosure other modifications will be apparent to persons skilled in the art. Such modifications may involve other features which are already known in the design, manufacture and use of GPS systems and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalization thereof, whether or not it relates to the same invention as presently claimed in any claims and whether or not it mitigates any or all of the same technical problems as does the present invention. The applicants hereby give notice that new claims may be formulated to such features and/or combinations of such features during the prosecution of the present application or of any further application derived therefrom.

I claim:

1. A method of obtaining vehicle heading information from a global positioning system (GPS), characterized in that the heading information is determined from $$k\Delta f = k\Delta d - V_{1X} \cdot \cos\theta_{1X} + V_{1Y} \cdot \cos\theta_{1Y} + V_{1Z} \cdot \cos\theta_{1Z} - m \cdot \cos\phi \cdot \cos\theta_{1N} - m \cdot \sin\phi \cos\theta_{1E}$$

where k is equal to the speed of light c divided by the GPS center frequency, $\Delta f$ is the total frequency offset perceived at the vehicle by a GPS receiver, $\Delta d$ is the amount by which the frequency of any local oscillator(s) in the GPS receiver have drifted from a nominal frequency, $V_{1X}$ is the velocity of a satellite in the direction X, $V_{1Y}$ is the velocity of the satellite in the direction Y, $V_{1Z}$ is the velocity of the satellite in the direction Z, where X,Y,Z are the axes of an Earth centered, Earth fixed (ECEF) coordinate system, $\theta_{1X}$ is the angle between the line joining the vehicle and the satellite to the axis X, $\theta_{1Y}$ is the angle between the line joining the vehicle and the satellite to the axis Y, $\theta_{1Z}$ is the angle between the line joining the vehicle and the satellite to the axis Z, m is the speed of the vehicle, $\phi$ is the vehicle's heading from its local North axis, $\theta_{1N}$ is the angle between the line joining the vehicle and the satellite to the vehicle's local North axis, $\theta_{1E}$ is the angle between the line joining the vehicle and the satellite to the vehicle's local East axis.

2. A method as claimed in claim 1, characterized in that the amount by which the frequency of the local oscillator(s) in the GPS receiver has drifted from the nominal frequency, $\Delta d$, is determined by reception of signals from two GPS satellites, measurement of the total frequency offsets of these two signals and the construction and solution of a pair of simultaneous equations, a first of said equations relating to a first satellite and a second of said equations relating to a second satellite.

3. A method as claimed in claim 1, characterized in that the amount by which the frequency of the local oscillator(s) in the GPS receiver differs from the GPS center frequency, $\Delta d$, is determined by reception of a signal from one GPS satellite while the vehicle is stationary.

4. A dead reckoning navigation system for mounting in a vehicle, characterized by a GPS receiver and a means of measuring the speed of the vehicle coupled to the GPS receiver, and in that the GPS receiver has means for determining the present heading of the vehicle by a method as claimed in claim 1.

5. A navigation system as claimed in claim 4, characterized in that the means of measuring the speed of the vehicle comprises a Doppler radar speedometer.

6. A method of obtaining vehicle heading information from a Global Positioning System (GPS), comprising the steps of:
a) determining the Doppler frequency offset present on a signal received at the approximate location of the vehicle from at least one GPS satellite due to the motion of the satellite alone,
b) measuring the Doppler frequency offset present on a signal received at the vehicle from the satellite and the motion of the vehicle combined,
c) measuring the speed of the vehicle, and
d) deriving the heading of the vehicle from a difference between the Doppler frequency offset due to the motion of the satellite alone, the measured Doppler frequency offset present on a signal received at the vehicle and the speed of the vehicle.

7. The method of claim 6, wherein the Doppler frequency offset present on a signal received at the approximate location of the vehicle from the satellite is determined from GPS ephemeris data.

8. The method of claim 6, further comprising determining the magnitude of any local oscillator offset imposed upon the signals received from the satellite.

9. The method of claim 8, wherein the Doppler frequency offset present on a signal received at the vehicle from the satellite and the motion of the vehicle combined is measured for two GPS satellites.

10. The method of claim 8, wherein the magnitude of any local oscillator offset is determined from the satellite while the vehicle is stationary.

11. A method as claimed in either claims 1 or 6, wherein the derived vehicle heading may have two possible values, characterized by measuring the magnitude of a vehicle turn by a method independent from the GPS, combining the magnitude of the vehicle turn with each of the possible heading values to provide a first pair of possible new heading values, deriving a second pair of possible new heading values from the GPS and by estimating a single heading value from the correlation between the first and the second pairs of possible new heading values.

12. A GPS receiver capable of receiving signals from a plurality of GPS satellites, characterized in that the receiver has means for determining its present heading by a method as claimed in either claim 1 or 6.

13. A GPS receiver capable of receiving signals from a plurality of GPS satellites, wherein the receiver has means for determining its present heading by determining the Doppler frequency offset present on a signals received at the approximate location of the vehicle from at least one GPS satellite due to the motion of the satellite alone, measuring the Doppler frequency offset present on a signal received at the vehicle from the satellite and the motion of the vehicle combined, measuring the speed of the vehicle, and deriving the heading of the vehicle from a difference between the Doppler frequency offset due to the motion of the satellite alone, the measured Doppler frequency offset present on a signal received at the vehicle and the speed of the vehicle.

* * * * *